Dec. 10, 1935.  R. HARVELL  2,023,471
AUTOMOBILE HEADLIGHT
Filed Aug. 17, 1932  4 Sheets-Sheet 1
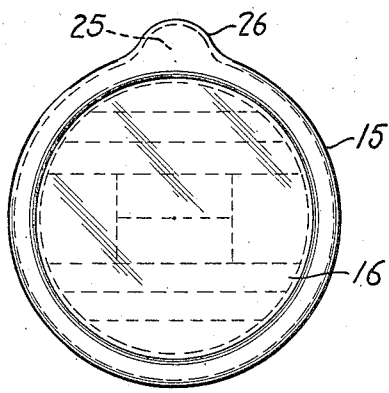
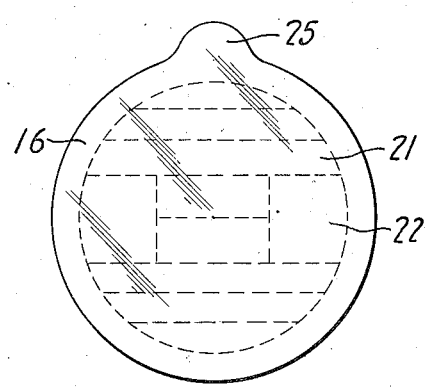
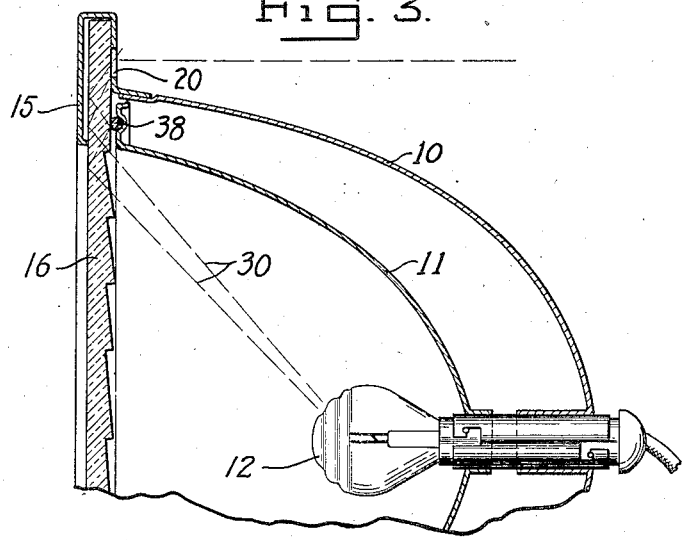
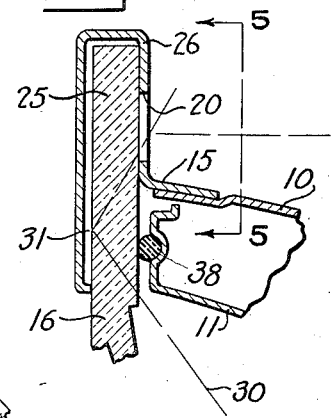
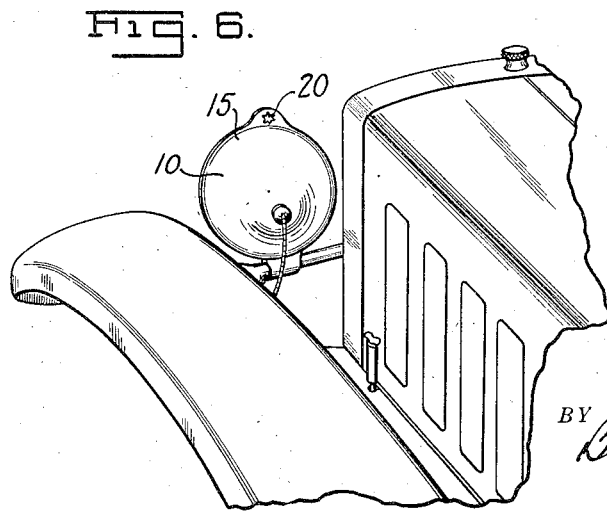
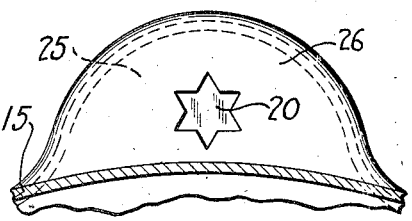
INVENTOR
Robert Harvell
BY Braselton, Whitcomb Davies
ATTORNEYS Dec. 10, 1935.  R. HARVELL  2,023,471
AUTOMOBILE HEADLIGHT
Filed Aug. 17, 1932  4 Sheets-Sheet 2
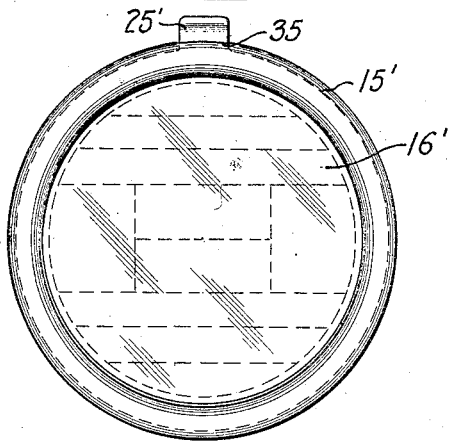
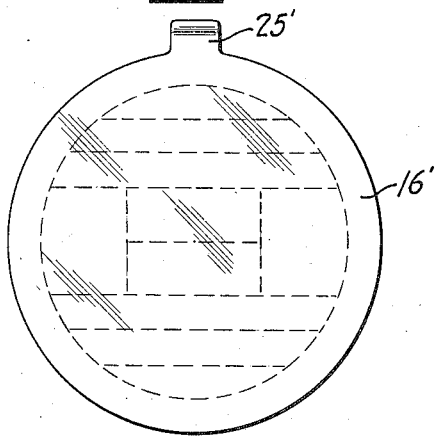
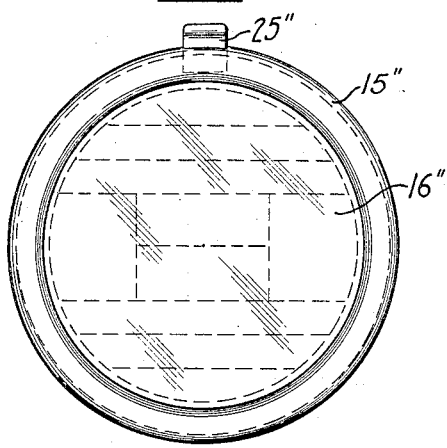
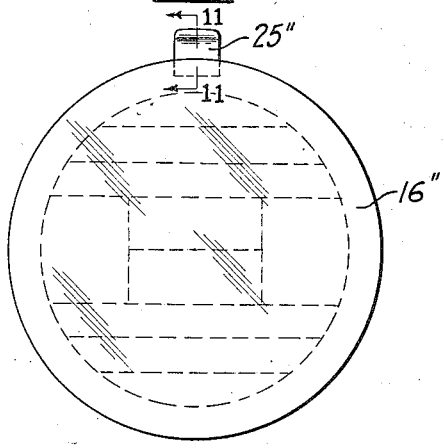
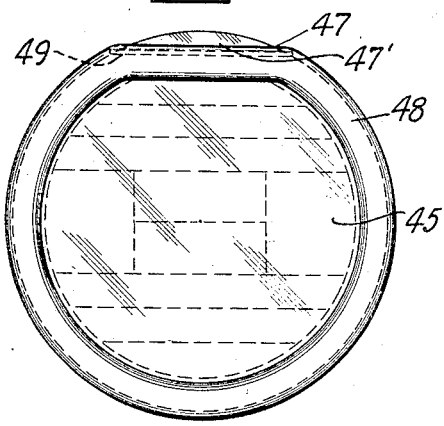
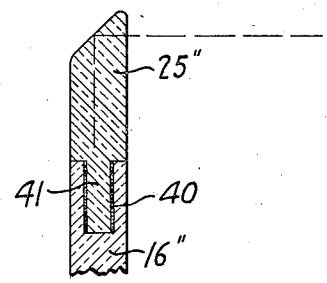
INVENTOR
Robert Harvell
BY Braselton, Whitcomb Davies
ATTORNEYS Dec. 10, 1935.      R. HARVELL      2,023,471
AUTOMOBILE HEADLIGHT
Filed Aug. 17, 1932     4 Sheets-Sheet 3
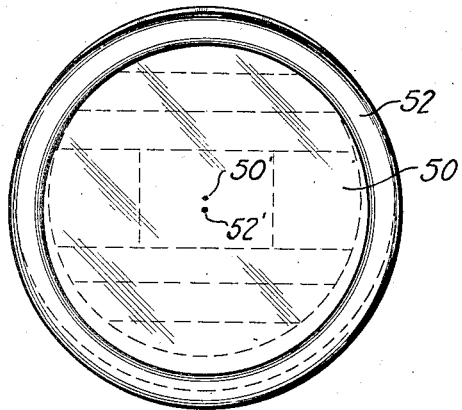
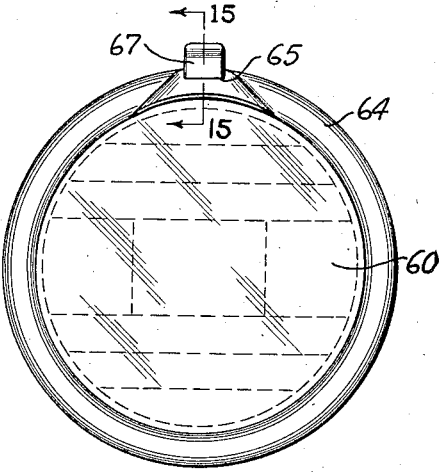
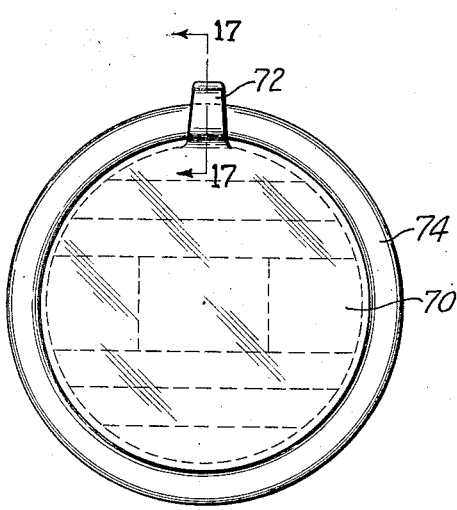
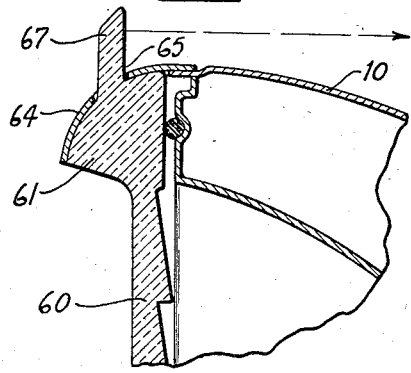
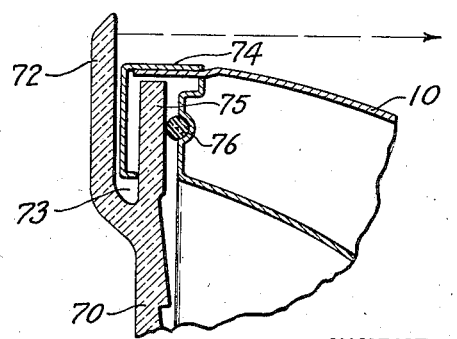
INVENTOR
Robert Harvell
BY Braselton, Whitcomb Davis
ATTORNEYS Dec. 10, 1935.  R. HARVELL  2,023,471
AUTOMOBILE HEADLIGHT
Filed Aug. 17, 1932    4 Sheets-Sheet 4

INVENTOR
Robert Harvell
BY Braselton, Whitcomb Davies
ATTORNEYS

Patented Dec. 10, 1935

2,023,471

UNITED STATES PATENT OFFICE 2,023,471

AUTOMOBILE HEADLIGHT

Robert Harvell, Tallahassee, Fla.

Application August 17, 1932, Serial No. 629,165

8 Claims. (Cl. 240—8.4)

This invention relates to an indicator for automobile headlights, particularly to means associated with the headlight construction for indicating to a driver whether or not the headlight is illuminated.

An object of the present invention is to provide a satisfactory economical and efficient construction in which an illumination is provided, or a portion of the rays from the headlamp light source is diverted, in such a manner that a visible signal or illumination area may be observed by the driver when the headlight bulbs are lighted or the filament or filaments energized. Consequently when one or the other of the bulbs, or any filament in any bulb becomes burned out, the driver is warned thereby. It is a feature of the present invention that the rays of light passing through the glass front cover plate or lens form in itself the visible signal or illuminated area, being understood however, that in certain embodiments of the invention, either portions of the lens itself may perform this function, or a separate piece of glass or other translucent or transparent or suitable material may be connected or associated with the lens to provide the desired results.

Thus, the general object of this invention is to produce an indicator in a simplified headlight construction which can be readily incorporated therein or applied thereto.

Another object of the invention is to provide a construction of this character in which, if the conventional design of headlamp configuration be changed the same will not mar the beauty of its design but may be readily retained or incorporated therein. Moreover in certain embodiments, the heretofore standard outline may be substantially maintained with my invention.

Many other objects and features of the invention will be apparent from this disclosure including various details of construction and other ideas shown in the various embodiments in the accompanying drawings in which:—

Figure 1 is a front elevation of a headlamp assembly involving my invention.

Figure 2 is a front elevation of the lens per se used therewith.

Figure 3 is a vertical longitudinal sectional view through an assembled embodiment of my invention.

Figure 4 is an enlarged sectional view of the lens extension of Figure 3.

Figure 5 is a rear view taken on the line 5—5 of Figure 4.

Figure 6 is a rear view of the headlamp assembled on an automobile to show how the indication is visible to the driver.

Figure 7 is a view similar to Figure 1 showing however, a different embodiment of my invention.

Figure 8 is a front view of the lens shown in Figure 7.

Figure 9 is a front view similar to Figure 1 of a still further embodiment of my invention applied to a headlamp.

Figure 10 is a view similar to Figure 8 of the glass cover front of the embodiment of Figure 9, while Figure 11 is a detail of the construction thereof.

Figure 12 is a view of a still further embodiment in which the lens itself is circular and the casing and/or rim is offset to permit the lens to extend therethrough.

Figure 13 is another embodiment in which both lens and rim and/or casing are substantially circular, with their centers offset.

Figure 14 is a front view of a further embodiment and Figure 15 is a detail of the construction thereof;

Figure 16 is a front view of a still further embodiment and Figure 17 is a detail of the construction thereof;

Figure 18:
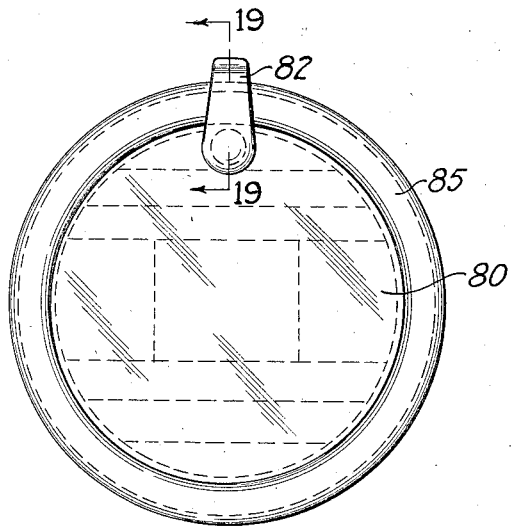
Figure 18 is a front view of another embodiment, the detail construction being shown in Figure 19.

Though I have chosen to illustrate my invention as incorporated in a headlight of an automotive vehicle, it is to be understood that I contemplate the use of my invention wherever it may be found to have utility.

In the embodiment illustrated in Figures 1 to 6, I have illustrated an outer casing 10, an inner preferably parabolic reflector 11, a standard type of two filament electric bulb 12, with suitable wiring therefor, the casing 10 being provided with the rim 15 arranged to clamp the reflector 11 and front glass lens 16 in place, as will be understood by those skilled in the art. As shown in Figure 5, the rim 15 has an opening 20 therein on the side visible from the driver's seat when assembled on the car as illustrated in Figure 6.

Referring to Figure 2, the lens 16 is shown in this instance with horizontal ribs or prisms 21 and clear spaces 22, although the same may be of any desired lens construction to perform required distribution of illumination down the roadway. As one embodiment of my invention however, as shown in Figure 2, the lens has an upward extension 25 integral with the main body portion of the lens 16. This portion 25 may extend outwardly on the side of the casing so as to be visible from the driver's seat and if desired this portion may be colored, red for one headlight and green for the other, or any other color or clear glass may be chosen. As will be seen from Figure 1, the rim 15 is conformed to the shape of the lens shown in Figure 2, said rim having an upwardly extended portion 26 to closely fit and conform to the projection 25 on the lens 16.

It is to be understood that the casing 10 may extend outwardly to the extreme outward periphery of the front portion thereof so that the opening 20 would be in the casing 10 instead of the rim 15.

In the connection with the underlying principle of the invention I have discovered that whereas the light projected through the front lens 16 is primarily intended to provide a beam of light directed forwardly of the automobile, yet due to certain optical laws the theory of the operation of which I am not at present fully aware, the extended portion 25 of the lens 16 becomes luminous, or forms a visible signal or indicating area which may be clearly seen from the driver's seat, even the portion 25 be rather small and the opening 20 likewise small. In Figure 4 I have indicated rays of light 30 emanating from the filament of the bulbs 12 shown as internally reflected at 31 opposite the opening 20, the internal reflection directing the rays rearwardly or at least in such a direction that the portion 25 constitutes a distinct illuminated area or visible signal.

Referring now to the embodiment illustrated in Figures 7 and 8, in this instance the lens 16' is provided with an extension 25' similar to the extension 25 of Figure 2, but in this instance the rim 15' is provided with a slot 35 in the outer periphery thereof through which the extension 25' of the glass lens 16 extends. Suitable packing may be located around the opening if necessary although as a rule the moisture is kept out of the reflector 11 by a cork gasket 38, shown in Figures 3 and 4, between the rim and lens assembly and the casing and the reflector assembly. It will be readily appreciated that the embodiment illustrated in Figures 7 and 8 is extremely economical to manufacture.

In the embodiment illustrated in Figures 9 to 11 inclusive, I have incorporated the same underlying principles but in this instance the extension 25'' is a separate glass or other suitable transparent or translucent material and the lens 16'' is provided with an opening 40 into which an extension 41 on the separate glass piece 25'' is adapted to be secured as by means of glass cement, adhesion means or mechanical means may be employed. In this embodiment of the invention the extension 25'' may extend through a slot in the rim 15'' or in the outer part of the casing 10 as the case may be, and the extension 25'' may be inserted in the opening 40 after the glass 16'' and rim 15'' have been assembled.

It is to be understood that the assembly between the rim and the glass be of any standard type or construction, there usually being notches in the glass to prevent slipping or rotation of the same relative to the rim and there being also spring clips of a width similar to the notches so that the glass can be inserted from the rear of the rim against the front flange of the rim and then turned around into place.

Referring to Figure 12 the lens 45 is circular and standard in every respect. The casing however, is flattened at the top as indicated at 47, the clamping rim 48 being likewise flattened off if desired or the same may be circular corresponding to the lens. A gasket 49 may be used to seal the opening between the rear face of the circular lens 45 and the top flattened portion at its front edge 47'. In Figure 13 both the lens 50 and the rim 52 are circular or of standard contour (as may be the case in Figure 12) but in Figure 13 the centers are offset as shown, 50' being the center of the lens and 52' the center of the rim.

In the embodiment illustrated in Figures 14 and 15, the lens 60 may have an enlarged portion 61 adjacent the upper part of the headlamp casing 10, the clamping rim 64 being formed to suitably enclose the enlarged portion of the lens and having an opening 65 through which is adapted to project the extension 67 of the lens. In this embodiment it will be noted that the enlarged portion 61 has been formed as an enlargement of only a portion of the lens and that the extension 67, visible to the operator of the vehicle, is formed integral therewith. The rim 64 has been suitably formed to completely enclose the enlarged portion of the lens and suitable packing may be utilized adjacent the opening 65 to prevent the ingress of water, moisture or other foreign substances.

Referring to Figures 16 and 17, it will be noted that the lens 70 is similar to the embodiment illustrated in Figures 7 and 8 except that the projection 72 extends from the front surface of the lens 70 so that a portion thereof is visible to the operator of the vehicle. The projection 72 and the portion 75 of the lens form a recess into which a portion of the clamping rim 74 extends. A gasket or sealing element 76 is positioned between casing 10 and the lens 70. It will be noted that in this embodiment the extension 72 has been formed integrally with the lens 70, though it may be a separate member.

Figure 19:
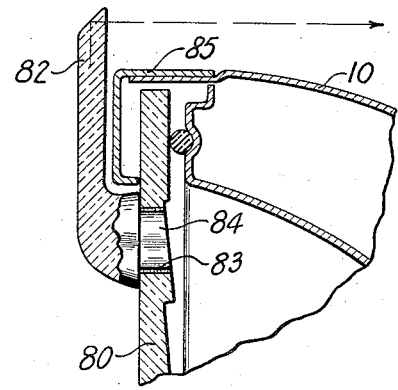

Referring now to the embodiment illustrated in Figures 18 and 19, I have illustrated the lens 80 having the indicator or extension 82 as a separate suitable transparent or translucent element secured to the lens by means of glass cement or mechanical means as desired. It will be noted that the lens has an opening 83 therein into which the portion 84 of the member 82 extends being secured therein in a suitable manner. The embodiment here shown is similar to that illustrated in Figures 16 and 17 as the element 82 extends around a portion of the clamping ring 85 which secures the lens to the casing 10.

Figure 20:
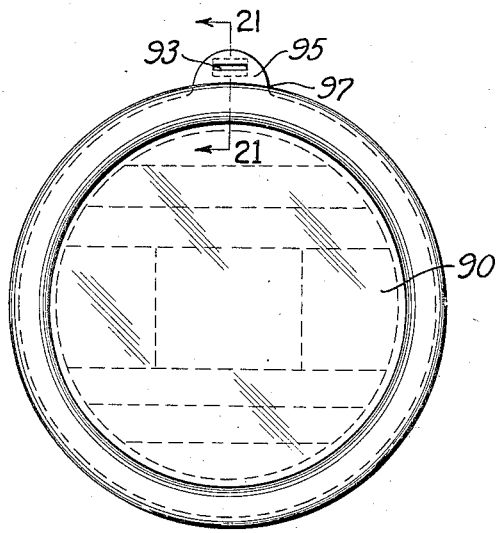
Figure 20 is a front view of still another embodiment, the detail construction being shown in Figure 21.
Figure 21:
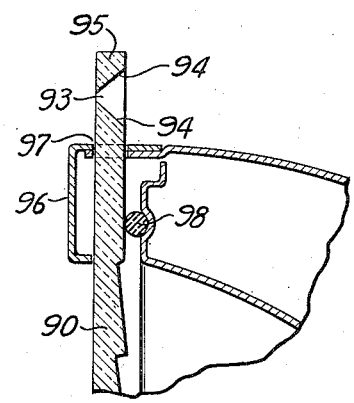

Figures 20 and 21 illustrate an embodiment of my invention wherein the lens 90 is provided with an extension 95 similar to the extension 25 of Figure 2, but in this instance the extension 95 is provided with an opening 93 having surfaces 94 therein for providing the visible signal. It will be noted in this embodiment that the retaining rim or ring 96 has an opening 97 therein through which the extension 95 projects. As previously described, a suitable packing material may be provided adjacent the opening 97, however the usual sealing gasket 98 may be utilized to prevent water or moisture from entering the casing.

It is apparent that, within the scope of the invention modifications and different arrangements may be made other than is herein disclosed, and the present disclosure is illustrative merely, the invention comprehending all variations thereof.

I claim as my invention:

1. In an automobile headlight the combination of a casing; a parallelizing reflector positioned within said casing; a light source adjacent to said reflector; a front lens; means in said casing for securing said lens; a transparent extension associated with said lens substantially in the plane thereof located so as to be visible from the driver's seat, said extension being snugly embraced by a portion of the means for securing said lens, whereby said headlight is waterproof.

2. A combined automobile headlight and telltale indicator comprising in combination, a casing, a reflector, a front lens, a rim for connecting said lens to said casing, said rim having an enlarged portion with an opening in the rear face thereof and an illuminous extension integral with said lens extending into said rim opposite said opening.

3. In combination, a casing, a reflector, a lens, a rim for connecting said lens to said casing, a peripheral extension on said rim having an opening in the rear thereof and a corresponding peripheral extension on said lens substantially in the plane thereof extending into said rim extension.

4. In combination, a casing, a reflector, a lens, a rim for connecting said lens to said casing, said rim having a slot in the periphery thereof and said lens having an illuminous projection associated therewith extending through said slot.

5. In a device of the class described, the combination of a casing, a reflector, a light source, a lens, a rim for connecting said lens to said casing with said reflector and light source assembled therein, a slot in the periphery of said rim and an integral extension on said lens extending into said slot outside said casing so as to be visible from the rear thereof when said device is located on an automobile.

6. In a device of the class described, a casing, a reflector, a light source, a lens, a rim for connecting said lens to said casing; said rim having a peripheral extension, and an integral extension on said lens substantially in the plane thereof extending into said rim extension, said rim having an open portion opposite said lens extension on the rear thereof to render said lens visible from the driver's seat.

7. In an automobile headlight, the combination of a casing, a reflector, a light source, a front glass cover plate, means for securing said casing, reflector and plate in assembled relation, an integral extension on the periphery of said plate, said securing means being arranged to enclose said extension so that a portion thereof is visible from the rear of said assembly, and means between said plate and said reflector to weatherproof said headlight.

8. In combination with a vehicle headlight, a casing, a light source; a reflector within said casing adjacent to said light source; a lens having a peripheral projection thereon and in the plane thereof; means to secure said lens to said casing and enclose said projection so that a portion of the projection is visible from the driver's seat; and means carried by said reflector to weatherproof said headlight.

ROBERT HARVELL.